Nov. 26, 1963   HANS-HEINRICH BERNING ETAL   3,111,886
PHOTOGRAPHIC CAMERA FOR SUPERVISION PURPOSES
Filed March 28, 1960                                   4 Sheets-Sheet 1
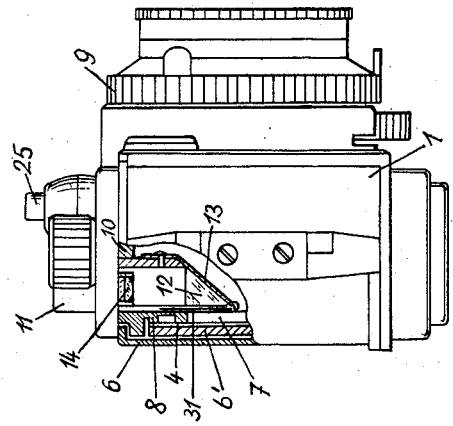
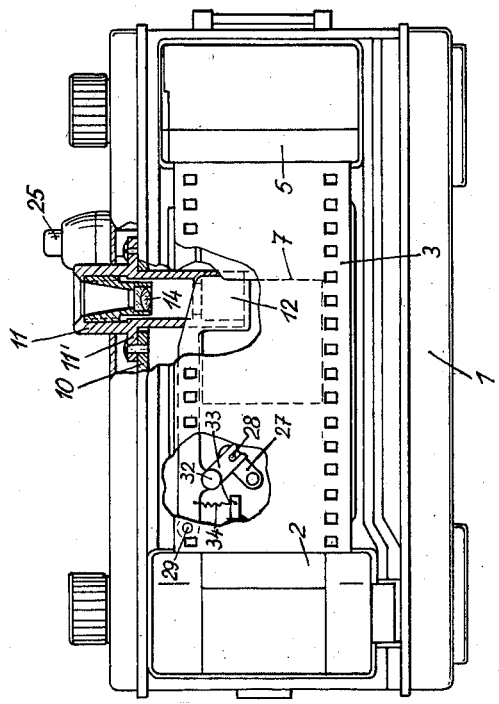
INVENTOR.

Nov. 26, 1963    HANS-HEINRICH BERNING ETAL    3,111,886
PHOTOGRAPHIC CAMERA FOR SUPERVISION PURPOSES
Filed March 28, 1960                                              4 Sheets-Sheet 3
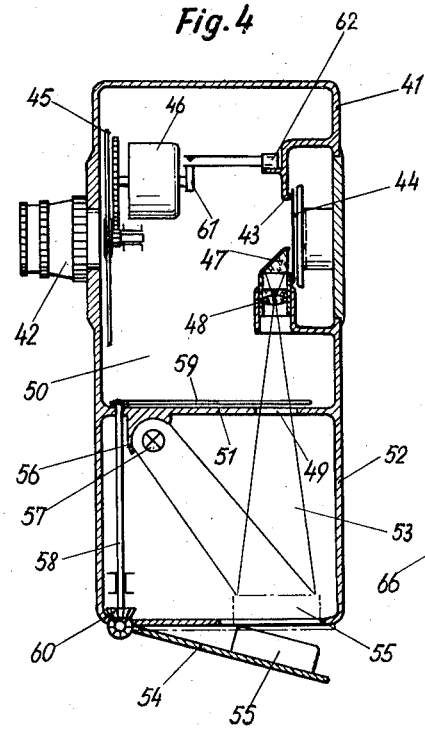
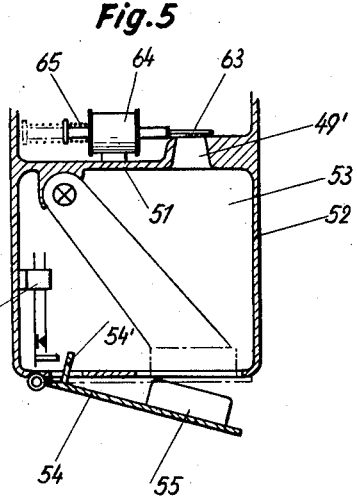
INVENTOR.
BY

INVENTOR.
BY

United States Patent Office 3,111,886
Patented Nov. 26, 1963

3,111,886
PHOTOGRAPHIC CAMERA FOR SUPERVISION PURPOSES
Hans-Heinrich Berning, Hosel, near Dusseldorf, Karl Tredopp, Dusseldorf, and Heinz Stoff, Solingen-Ohligs, Germany, assignors to Robot Foto und Elektronik G.m.b.H. & Co. KG.
Filed Mar. 28, 1960, Ser. No. 17,818
Claims priority, application Germany Mar. 28, 1959
9 Claims. (Cl. 95—1.1)

This invention is concerned with a photographic camera which is intended for supervision purposes. With the photographic supervision of occurrences, e.g. of street traffic, it is necessary to take a picture of one or several indicating instruments, e.g. a clock, a speedometer, a register or the like together with that of the visual field, so that a definite relation between the indication and the photographed visual field can be fixed photographically. It is well known to arrange the indicating instruments, which are to be photographed as a secondary image, within the visual field, so that they are imaged by the main objective on the margin of the image field. Often, however, arranging of the indicating instruments within the visual field causes considerable difficulties, in particular if an object to be photographed, e.g. a vehicle, is to be traced with the camera.

On the other hand, it is well known to reflect into a camera as a secondary image the image of an inclinometer mounted immediately within the camera, which image is provided by an auxiliary objective. Furthermore it is well known, by means of an auxiliary objective to produce on the margin of the image field the picture of a compass-needle mounted on the camera. In these cases it is the matter of the secondary imaging of such instruments by means of which the orientation of the camera during the main exposure is to be determined and fixed. Therefore, the instruments must be built into the camera itself and must be designed correspondingly small.

The invention has for its object to design a camera for supervision purposes in such a manner that on the margin of the image field a secondary image of any kind of instruments can be produced with appropriate scale of reduction by means of reflexion and an auxiliary objective, pictures being taken of instruments which do not indicate the orientation of the camera but other measuring values or conditions independent therefrom. The well known optical arrangements for the production of a secondary image are not adapted for such a supervision camera.

In accordance with the present invention this object is accomplished in that a reflecting element is positioned on the margin of the main image field directly in front of the image window and an auxiliary objective is positioned adjacent said reflecting element in such a manner that the path of rays of the auxiliary objective on the side of object protrudes out of a side wall of the camera housing rectangular to the front wall thereof. With such a setup of the optical elements required for the production of the secondary image, a small picture camera, which is usually equipped with a main objective of short focal length, can be designed as a supervision camera, as a place for the reflecting element can be provided also with a short focal length of the main objective. On the other hand, the object distance of the auxiliary objective is not limited by the dimensions of the camera, so that also instruments can be imaged the dimensions of which may be a multiple of the dimensions of the camera.

Advantageously the reflecting element consists of an angular prism the light exit surface of which can be covered by an auxiliary shutter controlled by the shutter of the camera. By such an auxiliary shutter operating between the film guiding means and the angular prism a simple and adjustable synchronization of the exposure of the main and the secondary image is achieved.

In a particularly simple manner the invention can be realized with those small picture cameras which are provided with a rotor shutter driven by a rotating driving disc. In such a case the auxiliary shutter may consist of a lever provided with an exposure flag which bears in a non-positive manner against an eccentric cam member rotating with the driving disc.

Usually such a supervision camera is used in connection with stationary indicating instruments and is fixedly installed. It is of course also possible to arrange the supervision camera and the indicating instruments in a so-to-say stationary manner on a common movable platform, so that their mutual positions are not changed if the platform is moved. In many cases, however, a stationary or so-to-say stationary application of the supervision camera is not possible or troublesome. In such cases it is advantageous to build the instrument into a camera, that which is well known per se with position or orientation indicating instruments in aircraft cameras. This is accomplished in further modification of the invention, while maintaining the described setup of the optical elements, in that a housing body is attached to the side wall provided with a ray exit opening, by which body a dark chamber is enclosed separated from the exposure chamber of the camera by said side wall and that in the dark chamber an illuminating light source controlled by the camera shutter and an indicating instrument to be imaged by the auxiliary objective at a reduced scale is housed.

Advantageously the indicating instrument is interchangeably mounted on a tiltably mounted cover of said housing body. Indicating instruments of different kind may then be interchangeably inserted into the supervision camera and adapt it to the various purposes. In order to make an exchange or an adjustment of the indicating instruments possible with the camera ready for exposure, in further modification of the invention provision is made that the ray exit opening of the side wall can be covered by a diaphragm automatically closing as soon as the cover is opened. Thus no unwanted external light can get into the exposure chamber when the dark chamber is opened.

A secondary image camera of the type described above can, however, also be assembled with a flashlight-lamp illuminating the visual field and an indicating device to be photographed as a secondary image within a common casing in such a manner that the camera and the indicating device are mounted on opposite walls of the casing and the reflector of the flashlight-lamp and a light protection funnel aligned with the main objective of the camera are sunk in into the front plate of the casing rectangular to these side walls. By such an assembly a transportable and in itself optically adjustable supervision device is obtained that has a large field of utility. This device can preferably be designed in such a manner that the reflector of the flashlight-lamp has a light exit opening within the casing, through which a portion of the light passes into the direction of the wall of the casing carrying the indicating device. Thus it is possible, to make use of the flashlight for the illumination of the visual field and of the object of the secondary image at the same time.

The invention will be more apparent from the following detailed description of several embodiments thereof, reference being had to the accompanying drawings FIGS. 1 to 6.

FIG. 1 shows a back view of a secondary image camera, the cover being removed.

FIG. 2 is a side view of this camera partly in section.

Figure 3:
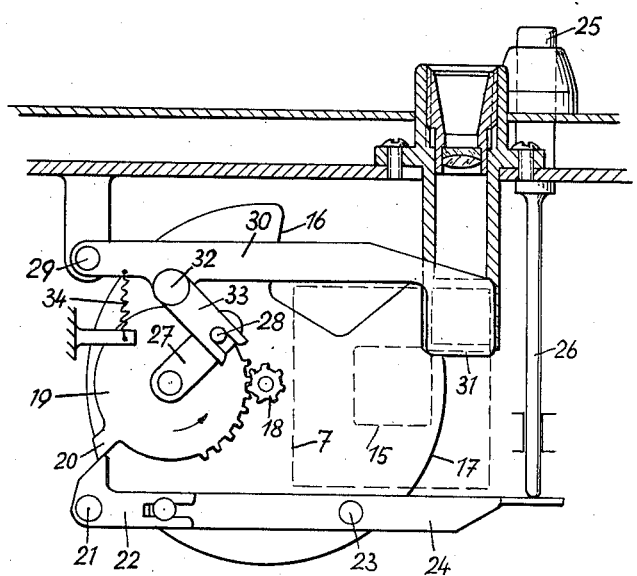

FIG. 3 diagrammatically represents the auxiliary shutter mechanism.

FIG. 4 shows in a side elevational sectional view a secondary image camera with built in indicating instrument.

FIG. 5 represents a modification of such camera.

Figure 6:
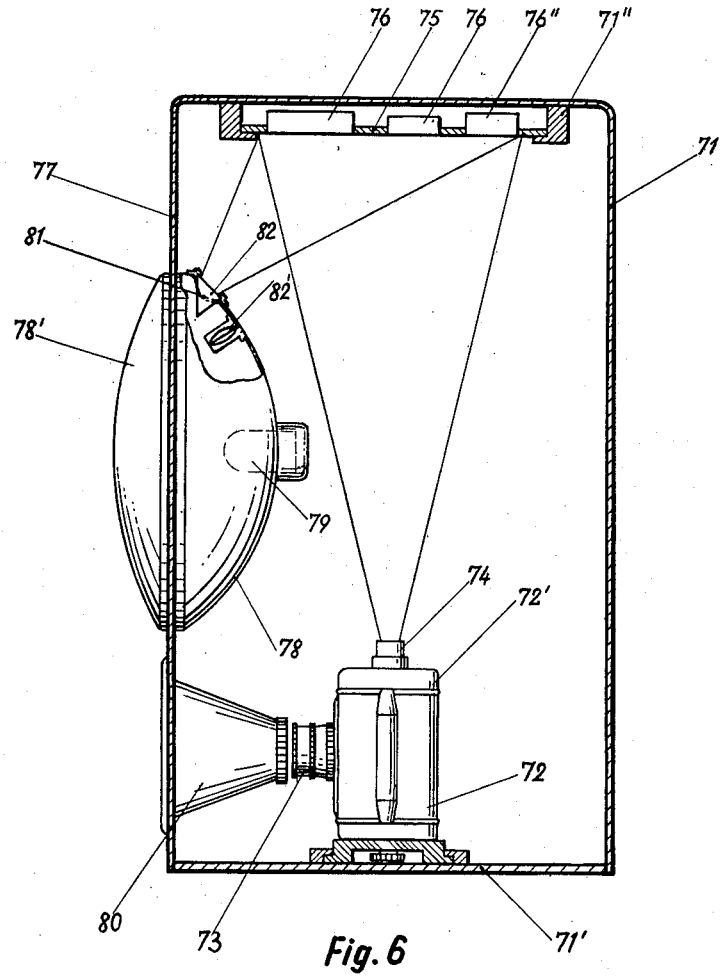

FIG. 6 shows diagrammatically a supervision device wherein a secondary image camera in accordance with FIGS. 1 and 2 is used.

In the casing 1 of a small picture camera a film 3 coming out of a film cartridge 2 is fed through a film channel 4 to a take-up cartridge or spool 5. The film channel 4 is formed by a press-on plate 6' attached to the cover of the casing 1 and a partition wall 8 of the casing provided with an exposure window. An objective 9 is arranged on the front side of the casing 1 by which in usual manner an image of the visual field is produced within the exposure window. To the upper side wall 10 of the casing 1 a frame 11 is attached with a flange 11', which partly extends into the interior of the casing 1. An angular prism 12 is fixed to the frame 11 by means of brackets 13 in such a manner that one cathete surface of the angular prism 12 is positioned in a short distance in front of a corner of the exposure window 7. An auxiliary objective 14 is supported by the frame 11, and via the angular prism 12 produces a secondary image of an indication instrument positioned outside the camera. The auxiliary objective is so arranged that a path of rays on the side of the object protrudes out of the side wall 10 of the camera casing 1 that is rectangular to the front side, while its path of rays on the side of the image is directed within the casing through the angular prism 12.

In order to ensure a synchronous exposure of the visual field and of the secondary image produced by the auxiliary objective 14, two electrically or mechanically coupled exposure shutters can be provided. In FIG. 3 an appropriate shutter arrangement is represented in a diagrammatic manner. The visual field is exposed by means of a rotor shutter of well known design, wherein behind an exposure opening 15 provided at the front side of the camera casing 1 a circular diaphragm 17 provided with an exposure cut-out 16 is moved. The diaphragm 17 is rotated by a pinion 18 meshing with a partially geared control disc 19. A shutter spring (not shown) tends to rotate the control disc 19 in the direction of an arrow, whereby the exposure cut-out 16 is passed behind the exposure opening 15. The control disc 19 is provided with a projection 20, bearing against a pawl 22. The pawl 22 is pivotally connected to a release lever 24 which is pivoted at 23. The release lever 24 is acted upon by a release pin 26 connected to the release button 25. By actuating the release button 25 the pawl 22 is turned aside by the release lever 24 so that the projection 20 of the control disc is released and the exposure of the visual field can take place.

A lever 27 is connected to the control disc 19 which lever bears a pin 28 eccentrically positioned with respect to the control disc 19. At 29 a lever 30 is pivoted in the camera casing 1 provided with an exposure flag 31. The exposure flag 31 enters the narrow slot remaining between the rear surface of the angular prism 12 and the partition wall 8 of the casing and covers the light transmission surface of the angular prism 12. The exposure of the secondary image is obtained by a short rotational movement of the lever 30 provided with the exposure flag 31. This is accomplished by means of a fork-shaped lever 33 which is pivoted at 32 on the lever 30 and encompasses the pin 28. By a spring 34 the lever 30 is drawn towards below so that the exposure flag 31 is in the closing position as shown. As soon as the control disc 19 is released through the release button 25 and the rotor shutter is brought into operation, the lever 30 is lifted by the lever 27 rotating with the control disc 19 and by means of the pin 28 and the fork-shaped lever 33 and is pulled down again after the lever 27 has passed through its dead point. Thereby simultaneously with the exposure of the visual field an exposure of the secondary image takes place by means of the exposure flag 31 acting as an auxiliary shutter.

With the embodiment represented in FIG. 4 a main objective 42 is attached to the front side of a camera casing 41 and produces an image of the visual field on a film 44 bearing against an exposure window 43. The exposure of the main image field takes place by a well known rotary diaphragm shutter 45 the drive mechanism 46 of which is not shown in detail.

Immediately in front of the exposure window 43 is an angular prism 47 and in front thereof an auxiliary objective 48 is arranged. The path of rays on the side of the object passes through an opening 49 in a side wall 51 closing the exposure chamber 50 of the camera. Adjacent the side wall 51 is a housing body 52 enclosing a dark chamber 53. The housing body 52 is provided with a tiltably mounted, tightly closing cover 54 to which an indicating instrument is interchangeably fixed. In the dark chamber 53 a light source for the illumination of the indicating instrument and provided with a reflector is housed. In front of the light exit opening 49 a cover diaphragm mounted in the housing body by means of a pivot shaft 58 is arranged. The pivot shaft is coupled to the hinge shaft by means of a level gearing 60 in such a manner, that upon the opening of the cover 54 the cover diaphragm 59 is rotated automatically over the light exit opening and tightly closes the same. With the cover 54 closed the indicating instrument 55 is imaged on the film at a reduced scale at the margin of the exposure window by the auxiliary objective 48 and the angular prism. The illumination of the secondary image is achieved by a flashing up of the light source 57 which is switched on for a short time synchronous with the rotor shutter 45, by the shutter mechanism 46 by means of a cam 61 and a switch 62.

The cover 54 can be opened, while the camera is ready for exposure, as the automatically operative cover diaphragm prevents the entrance of external light into the exposure chamber 50. With the cover 54 open the indicating instrument 55 can be adjusted or exchanged for some other one.

In FIG. 5 a modified embodiment is represented schematically.

The light exit opening of the side wall 51 is here closed by a safety shutter 63 which can be shifted by an electro-magnet 64 against the action of a return spring 65. When the cover 54 is closed a switch 66 lying in the circuit of the electro-magnet 64 is opened by a projection 54' provided on the cover. When the cover 54 is opened, the switch 66 is closed automatically so that the electro-magnet is energized and the light exit opening is automatically closed.

With the photographic supervision device represented in FIG. 6 a supervision camera 72 is mounted within a housing 71 on the bottom wall 71' thereof. The main objective 73 of the camera 72 is directed towards the front side of the housing 71. An auxiliary objective 74 projecting from the top wall 72' of the camera 72 is directed towards the top wall 71" of the housing 71, to which several indicating instruments 76, 76', 76" are fixed on a removable and interchangeable support 75. By the auxiliary objective 74 a secondary image of the indicating instruments 76, 76', 76" at a reduced scale is produced on the film on the margin of the main image field.

Into the front plate of the housing 71 above the camera 72 the reflector 78 of a flashlight-lamp is sunk in. Additionally a light protection funnel aligned with the main objective 73 of the camera is fixed to the front plate 77. In its upper portion the reflector 78 is provided with a light exit opening 81 through which the light of the flashlight-lamp 79 strikes the indicating instruments 76, 76', 76". In front of the light exit opening appropriate light spreading means 82, 82' are positioned by which an illumination of the indicating instruments 76, 76', 76" as uniform as possible is obtained.

By the reflector 78 of the flashlight-lamp 79 the visual field to be photographed by the main objective 73 is illuminated a diffusing disc being used if necessary, while at the same time the indicating instruments 76, 76', 76" are illuminated through the light exit opening 81 and the optical means 82, 82' and are photographed as a secondary image by the auxiliary objective.

Invention is claimed as follows:

1. A photographic camera for simultaneously photographing two separate objects on a single negative frame comprising a camera housing, a primary image-forming assembly positioned therein comprised of a primary objective lens in a first wall of said housing, primary shutter means including a rotary shutter driven by a rotating driving disc, and an aperture plate provided with an exposure aperture and adapted to retain photographic film in the focal plane of said primary objective lens and define the margins for an exposure on said film, a secondary image-forming assembly positioned within said housing comprised of an auxiliary objective lens, a light entrance for said auxiliary objective lens positioned in a second wall of said housing, reflective means including a right angular prism having light entering and light exiting surfaces, said prism being positioned immediately in front of a minor portion of said exposure aperture and shadowing said minor portion to light from the primary objective lens and so arranged as to receive an image from said auxiliary objective lens and reflect said image through said exposure aperture and focus said image on the focal plane of said film over said minor portion of the area of said exposure aperture, and an auxiliary shutter comprising a movable lever having an exposure flag covering one surface of said prism, said auxiliary shutter having means operatively connecting said lever and said driving disc to move said lever and uncover said surface coincident with the actuation of the rotary shutter to expose said minor portion through said auxiliary lens coincident with the exposure of the remainder of said aperture through said primary lens, said secondary image-forming assembly being arranged to photograph an object oriented in a different position from the object being photographed by said primary image-forming assembly, whereby activation of said primary shutter means causes an image from said primary image-forming assembly to be projected and focused on said film over the unshadowed major portion of said exposure aperture, and simultaneously causes a secondary image from said secondary image-forming assembly to be projected and focused on said film over said minor portion of said exposure aperture, both images being within said margins.

2. A photographic camera as set forth in claim 1, wherein said camera includes a dark chamber outside the second side wall of said camera housing, an indicating instrument so mounted in said dark chamber that, when illuminated with the auxiliary shutter open, an image thereof is projected by said secondary image-forming assembly onto said focal plane, said indicating instrument being releasably affixed to a side of said dark chamber, and a light source in said dark chamber to illuminate said indicating instrument.

3. A photographic camera for simultaneously photographing two separate objects on a single negative frame comprising a camera housing, a primary image-forming assembly positioned therein comprised of a primary objective lens in a first wall of said housing, primary shutter means including a primary shutter and a shutter release, and an aperture plate provided with an exposure aperture and adapted to retain photographic film in the focal plane of said primary objective lens and define the margins for an exposure on said film, a secondary image-forming assembly positioned within said housing comprised of an auxiliary objective lens, a light entrance for said auxiliary objective lens positioned in a second wall of said housing, reflective means positioned immediately in front of a minor portion of said exposure aperture and shadowing said minor portion to light from the primary objective lens and so arranged as to receive an image from said auxilary objective lens and reflect said image through said exposure aperture and focus said image on the focal plane of said film over said minor portion of the area of said exposure aperture, a dark chamber outside the second side wall of said camera housing, said chamber having a tiltably mounted cover on the side thereof opposite said light entrance for said auxiliary objective lens, an indicating instrument positioned in said dark chamber in the field of view of the auxiliary objective lens, means in said dark chamber to illuminate the indicating means, auxiliary means operatively connected to the primary shutter means to expose said minor portion through said auxiliary lens coincident with the exposure of the remainder of said aperture through said primary lens, whereby activation of said primary shutter means causes an image from said primary image-forming assembly to be projected and focused on said film over the unshadowed major portion of said exposure aperture, and simultaneously causes a secondary image from said secondary image-forming assembly to be projected and focused on said film over said minor portion of said exposure aperture, both images being within said margins, and a diaphragm connected to said cover and so arranged that said diaphragm covers said light entrance for said auxiliary objective lens when said cover is opened.

4. A photographic camera according to claim 3, wherein said diaphragm is rotatably mounted on said housing and is positively coupled to said tiltably mounted cover by means of gears.

5. A photographic camera according to claim 3 having an electromagnet connected to said diaphragm and having a switch in the circuit of said electromagnet arranged to be activated by said tiltably mounted cover.

6. A photographic camera according to claim 3 wherein said indicating instrument is releasably affixed to said cover.

7. A photographic camera for simultaneously photographing two separate objects on a single negative frame, said camera comprising an external housing, a camera housing within said external housing, a primary image-forming assembly positioned in the camera housing and comprised of a primary objective lens in a first wall of said camera housing, said external housing having an aperture in a wall thereof for providing access to said primary objective lens for light from a primary object to be photographed, tubular means arranged between said aperture and said primary objective lens for preventing stray light from reaching the interior of the external housing, primary shutter means including a primary shutter and a shutter release, and an apeture plate provided with an exposure aperture and adapted to retain photographic film in the focal plane of said primary objective lens and define the margins for an exposure on said film, a secondary image-forming assembly positioned within said housing comprised of an auxiliary shutter, an auxiliary objective lens, a light entrance for said auxiliary objective lens positioned in a second wall of said housing, reflective means positioned immediately in front of a minor portion of said exposure aperture and shadowing said minor portion to light from the primary objective lens and so arranged as to receive an image from said auxiliary objective lens and reflect said image through said exposure aperture and focus said image on the focal plane of said film over said minor portion of the area of said exposure aperture, an indicating device mounted in said external housing opposite said auxiliary objective lens and arranged to be photographed by the secondary image-forming assembly of said camera, and flash lamp means mounted on a wall of said external housing to provide illumination for said primary object to be photographed and at the same time for said indicating device in the external housing, whereby flashing of said flash lamp means and the opening of both said primary and auxiliary shutters cause a large image of said primary object and a small image of said indicating device to be photographed simultaneously on a single film frame.

8. A photographic camera according to claim 7, wherein the flash lamp means has a reflector to direct the light toward the primary object to be photographed and said reflector is provided with a light exit opening into said housing permitting a portion of the light from said flash lamp to pass therethrough for illuminating said indicating device.

9. A photographic supervision device according to claim 8, wherein a light spreading optical means is positioned in front of the light exit of said flash lamp reflector.

References Cited in the file of this patent

UNITED STATES PATENTS

| | | |
|---|---|---|
| 1,117,159 | Berst | Nov. 17, 1914 |
| 1,364,462 | Stout | Jan. 4, 1921 |
| 1,722,935 | Messter | July 30, 1929 |
| 2,226,364 | Anthony | Dec. 24, 1940 |
| 2,616,177 | Bazhaw | Nov. 4, 1952 |
| 2,830,512 | Nagel | Apr. 15, 1958 |
| 2,868,064 | Henkel | Jan. 13, 1959 |
| 2,896,522 | Stein | July 28, 1959 |
| 2,953,073 | Birch | Sept. 20, 1960 |